(12) United States Patent  
Bülow et al.

(10) Patent No.: US 7,347,887 B2
(45) Date of Patent: Mar. 25, 2008

(54) OXYGEN SORBENT COMPOSITIONS AND METHODS OF USING SAME

(75) Inventors: Martin Bülow, Basking Ridge, NJ (US); Jürgen Böer, Nordhausen (DE); Wolfgang Burckhardt, Hermsdorf (DE); Hans Ulrich Guth, Greifswald (DE); Helmut Ullmann, Freital (DE); Vladimir V. Vashook, Dresden (DE)

(73) Assignee: The BOC Group, Inc., Murray Hill, NJ (US)

(*) Notice: Subject to any disclaimer, the term of this patent is extended or adjusted under 35 U.S.C. 154(b) by 261 days.

(21) Appl. No.: 11/005,579

(22) Filed: Dec. 6, 2004

(65) Prior Publication Data

US 2005/0176589 A1 Aug. 11, 2005

Related U.S. Application Data

(60) Provisional application No. 60/531,780, filed on Dec. 22, 2003.

(51) Int. Cl.
*B01D 53/04* (2006.01)

(52) U.S. Cl. .......................... 95/138; 502/525

(58) Field of Classification Search ............... 95/90, 95/95, 138; 423/219, 579; 502/400, 525
See application file for complete search history.

(56) References Cited

U.S. PATENT DOCUMENTS

| | | | |
|---|---|---|---|
| 4,933,054 A | 6/1990 | Mazanec et al. | |
| 5,244,753 A | 9/1993 | Taniguchi et al. | |
| 5,314,508 A | 5/1994 | Taniguchi et al. | |
| 5,342,703 A | 8/1994 | Kawasaki et al. | |
| 5,403,461 A | 4/1995 | Tuller et al. | |
| 5,453,330 A | 9/1995 | Kawasaki et al. | |
| 5,478,444 A | 12/1995 | Liu et al. | |
| 5,509,189 A | 4/1996 | Tuller et al. | |
| 5,573,737 A | 11/1996 | Balachandran et al. | |
| 5,604,048 A | 2/1997 | Nishihara et al. | |
| 5,648,304 A | 7/1997 | Mazanec et al. | |
| 5,702,999 A | 12/1997 | Mazanec et al. | |
| 5,788,748 A | 8/1998 | Mazanec et al. | |
| 6,004,696 A | 12/1999 | Barnett et al. | |
| 6,059,858 A | 5/2000 | Lin et al. | |
| 6,120,924 A | 9/2000 | Chiba et al. | |
| 6,143,203 A | 11/2000 | Zeng et al. | |
| 6,146,549 A | 11/2000 | Mackay et al. | |
| 6,197,719 B1 | 3/2001 | Choudhary et al. | |
| 6,379,586 B1 | 4/2002 | Zeng et al. | |
| 6,440,283 B1 | 8/2002 | Liu | |
| 6,464,955 B2 | 10/2002 | Zeng et al. | |
| 6,471,921 B1 | 10/2002 | Van Calcar et al. | |
| 6,475,657 B1 | 11/2002 | Del Gallo et al. | |
| 6,541,159 B1 | 4/2003 | Li et al. | |
| 6,641,626 B2 | 11/2003 | Van Calcar et al. | |
| 6,740,441 B2 | 5/2004 | Jacobson et al. | |
| 6,761,838 B2 | 7/2004 | Zeng et al. | |
| 6,772,501 B2 | 8/2004 | Barker et al. | |
| 2002/0009628 A1 | 1/2002 | Hara et al. | |
| 2002/0064494 A1* | 5/2002 | Zeng et al. ............... | 423/418.2 |
| 2002/0179887 A1 | 12/2002 | Zeng et al. | |
| 2003/0047070 A1* | 3/2003 | Flippo et al. .............. | 95/92 |

FOREIGN PATENT DOCUMENTS

| | | |
|---|---|---|
| CN | 99113004.9 | 6/1999 |
| CN | 1360968 A | 7/2002 |
| CN | 1426123 A | 6/2003 |
| DE | 4119498 A1 | 12/1992 |
| DE | 4217339 A1 | 12/1993 |
| DE | 19839202 A1 | 4/1999 |
| DE | 19949431 A1 | 4/2000 |
| EP | 0 995 715 A1 | 4/2000 |
| FR | 2696109 | 4/1994 |
| JP | 5-4044 | 1/1993 |
| JP | 11242960 | 9/1999 |
| JP | 2002 151091 | 5/2002 |
| WO | WO 94/05046 | 3/1994 |

OTHER PUBLICATIONS

L. Er-Rakho, C. Michel, F. Studer, B. Raveau, "The Oxygen Deficient Perovskites AFe1-xCuxO2.5-x/2+delta (A=Sr, Ba) Exhibiting Mixed Valence of Iron and Copper Ions," J. Phys. Chem. Solids, vol. 49, No. 9, 1988, pp. 1101-1106.
A. Tiwari, K.P. Rajeev, "Effect of Oxygen Stoichiometry on the Electrical Resistivity Behaviour of NdNiO3-delta," Solid State Communications, vol. 109, 1999, pp. 119-124.
A. Tiwari, K.P. Rajeev, "Electrical Transport in LaNi03-[delta] (0<=[delta]<=0.14)," The Institution of Electrical Engineers, Stevenage, GB; 1999; Database Inspec [Online], Database accession No. 6298768; XP002321352.

(Continued)

*Primary Examiner*—Frank M. Lawrence
(74) *Attorney, Agent, or Firm*—Philip H. Von Neida (57) ABSTRACT

Composites and methods useful for oxygen sorption and other uses are presented, the composites comprising:
(A) one or more crystalline ceramic oxides selected from compounds within general formula (1):

$$A_x A'_{x'} B_y B'_{y'} O_{3-\delta} \text{ and} \tag{1}$$

(B) one or more crystalline ceramic oxides selected from compounds within general formulas (2), (3), (4), (5), (6), (7), and (8):

$$A_2 BO_{4-\delta} \tag{2}$$

$$A_2 B_2 O_{5-\delta} \tag{3}$$

$$AO(ABO_{3-\delta})_n \tag{4}$$

$$AM_2 Cu_3 O_{7-\delta} \tag{5}$$

$$Bi_4 V_{2(1-x)} Me_{2x} O_{11-3x'} \tag{6}$$

$$A''B''O_3 \tag{7}$$

$$A_2 B_2 O_{7-\delta}. \tag{8}$$

2 Claims, 4 Drawing Sheets

OTHER PUBLICATIONS

M. Abbate, G. Zampieri, F. Prado, A. Caneiro, J.M. Gonzalez-Calbet, M. Vallet-Regi, "Electronic Structure and Metal-Insulator Transition in LaNiO3-[delta]," The Institution of Electrical Engineers, Stevenage, GB; 2002; Database Inspec [Online], Database accession No. 7265938; XP002321353.

F. Rouquerol, J. Rouquerol, K. Sing, Adsorption By Powders and Porous Solids, Chapter 3. Methodology of Adsorption, 1999, pp. 60-63, Academic Press, London.

P.J. Gellings and H.J.M. Bouwmeester, The CRC Handbook of Solid State Electrochemistry, 1996, pp. 481-482, CRC Press, Boca Raton, Florida, USA.

H. Ullmann, Keramische Zeitschrift, 53 (2001), pp. 100-107, Germany.

L.G. Tejuca and J.L.G. Fierro, Properties and Applications of Perovskite-Type Oxides, 1993, pp. VII-VIII, Marcel Dekker, New York, USA.

S.J. Skinner and J.A. Kilner, "Oxygen Ion Conductors," Materialstoday, Mar. 2003, pp. 30-37.

Y. Teraoka et al., "Oxygen-Sorptive Properties of Defect Perovskite-Type $La_{1-x}Sr_xCo_{1-y}Fe_yO_{3-\bullet}$," Chemistry Letters, pp. 1367-1370, 1985.

Y. Teraoka et al., "Oxygen Permeation Through Perovskite-Type Oxides," Chemical Letters, 1985, pp. 1743-1746.

L. Yang et al., "Effect of the Size and amount of ZrO2 Addition on Properties of $SrCo_{0.4}Fe_{0.60}$ e-•," AIChE Journal, Sep. 2003, vol. 49, No. 9; pp. 2374-2382.

J. Mizusaki et al., "Nonstoichiometry of the Perovskite-Type Oxides $La_{1-x}Sr_xCoO_{3-\bullet}$," Journal of Solid State Chemistry 80, pp. 102-111 (1989).

M.H.R. Lankhorst and H.J.M. Bouwmeester, "Determination of Oxygen Nonstoichiometry and Diffusivity in Mixed Conducting Oxides by Oxygen Coulometric Titration," J. Electrochem. Soc., vol. 144, No. 4, Apr. 1997, pp. 1268-1273.

Y. Zeng and Y.S. Lin, "A Transient TGA Study on Oxygen Permeation Properties of Perovskite-Type Ceramic Membrane," Solid State Ionics, 110 (1998) pp. 209-221.

R.D. Shannon, "Revised Effective Ionic Radii and Systematic Studies of Interatomic Distances in Halides and Chalcogenides," Acta Cryst. (1976), A32, pp. 751-767.

W. Geipel and H.J. Ullrich, Füllkörper-Taschenbuch, 1991, pp. 11, V, VI, Vulkan Verlag, Essen, Germany.

R.J. Wijngaarden, A. Kronberg, K.R. Westerterp, Industrial Catalysis: Optimizing Catalysts and Processes, 1998, pp. VI-X, Wiley-VCh. Weinheim.

Zongping Shao, Weishen Yang, You Cong, Hui Dong, Jianhua Tong, Guoxing Xiong, "Investigation of the Permeation Behavior and Stability of a $Ba_{0.5}Sr_{0.5}Co_{0.8}Fe_{0.2}O_{3-\bullet}$ Oxygen Membrane," Journal of Membrane Science 172 (2000) pp. 177-188.

Shiguang Li, Wanqin Jin, Pei Huang, Nanping Xu, Jun Shi, "Perovskite-Related ZrO2-Doped $SrCo_{0.4}Fe_{0.6}O_{3-\bullet}$ Membrane for Oxygen Permeation," AIChE Journal, Feb. 1999, vol. 45, No. 2, pp. 276-284.

"Perovskite—Basic Information," Materials Science and Engineering, University of Arizona, 4 pages, Sep. 13, 2004, at http://aml.arizona.edu/classes/mse222/1998/perovskite/basicinfo.htm.

Zongping Shao, You Cong, Guoxing Xiong, Shishan Sheng, Weishen Yang, "Perovskite-type B-site Bi-doped Ceramic Membranes for Oxygen Separation," Chinese Science Bulletin, vol. 45, No. 10, May 2000, pp. 889-893.

Hui Dong, Guoxing Xiong, Zongping Shao, Shenglin Liu, Weishen Yang, "Partial Oxidation of Methane to Syngas in a Mixed-Conducting Oxygen Permeable Membrane Reactor," Chinese Science Bulletin, vol. 45, No. 3, Feb. 2000, pp. 224-226.

Zongping Shao, You Cong, Guoxing Xiong, Shishan Sheng, Weishen Yang, "Mixed-Conducting Perovskite-Type $Sr_xBi_{1-x}FeO_{3-\bullet}$ Oxygen-Permeating Membranes," Science in China (Series B), vol. 43, No. 4, Aug. 2000, pp. 422-427.

H. Takamura, "Development of High Performance Natural Gas Reforming System for Home Use Fuel Cells," Japan Science and Technology Corp., 4 pages, accessed Sep. 10, 2004 at http://ceram.material.tohoku.ac.jp/~crest/research_opm_e.html.

Zongping Shao, Guoxing Xiong, You Cong, Weishen Yang, "Synthesis and Oxygen Permeation Study of Novel Perovskite-Type $BaBi_xCo_{0.2}Fe_{0.8-x}O_{3-\bullet}$ Ceramic Membranes," Journal of Membrane Science, 164 (2000), pp. 167-176, Elsevier.

Nina Orlovskaya, Yury Gogotsi, Michael Reece, Bolin Cheng, Ion Gibson, "Ferroelasticity and Hysteresis in LaCoO3 Based Perovskites," Acta Materialia, vol. 50 (2002), pp. 715-723, Pergamon.

Z. Shao et al., "Ba Effect in Doped $Sr(Co_{0.8}Fe_{0.2})O_{3-\bullet}$ on the Phase Structure and Oxygen Permeation Properties of the Dense Ceramic Membranes," Separation and Purification Technology, 25 (2001) 419-429, USA.

M.H.R. Lankhorst and H.J.M. Bouwmeester, "Determination of Oxygen Nonstoichiometry and Diffusivity in Mixed Conducting Oxides by Oxygen Coulometric Titration," J. Electrochem. Soc., vol. 144, No. 4, Apr. 1997, pp. 1261-1267.

Teiji Nakamura, Makoto Misono, Yukio Yoneda, "Reduction-Oxidation and Catalytic Properties of Perovskite-Type Mixed Oxide Catalysts," Chemistry Letters, pp. 1589-1592, 1981.

* cited by examiner

OXYGEN SORBENT COMPOSITIONS AND METHODS OF USING SAME

CROSS-REFERENCE TO RELATED APPLICATIONS

This application claims priority from U.S. provisional application No. 60/531,780, filed Dec. 22, 2003, which is incorporated herein by reference in its entirety.

BACKGROUND OF THE INVENTION

1. Field of the Invention

The invention is generally related to the field of oxygen sorbent materials.

2. Related Art

Materials having the ability to absorb oxygen are useful in many industries, for example enrichment of oxygen from air or other multicomponent fluid. One useful class of crystalline materials is the so-called mixed ionic-electronic conductors (MIEC). These materials have exhibited enhanced sorption, as well as enhanced ionic and electronic conductivities, particularly their oxide-ion mobility and oxygen-($O_2$)-storing capacities. High-temperature non-stoichiometric defects (such as oxide-ion vacancies or interstitial oxygen sites) in the crystal-lattice allow the materials to temporarily sorb oxygen at high-temperature for oxygen enrichment of gas streams, as well as for catalytic transformations of other compounds using the oxygen that is temporarily absorbed.

Potential applications of MIEC materials have been documented: production of syngas and $H_2$; partial oxidation of light hydrocarbons; production of pure $O_2$ (with a view toward replacing, possibly, cryogenic distillation); production of $O_2$-enriched gas mixtures; various environment-related solutions; and solid-oxide fuel cells and sensors (cf., for example, P. J. Gellings and H. J. M. Bouwmeester, *Solid State Electrochemistry*, CRC Press, Boca Raton, 1996; H. Ullmann, *Keramische Zeitschrift*, 53 (2001) 100-107; S. J. Skinner and J. A. Kilner, *materialstoday* (March 2003) 30-37. Specifically, Ion-Transport-Membrane (ITM) technologies for $O_2$ separation and syngas production are under quickly progressing development.

Technologies other than ITM, such as cyclic high-temperature sorption-desorption processes based on $O_2$ partial-pressure swings, have gained considerable interest. Cyclic $O_2$-recovery processes that utilize specific ceramic materials, such as $K_2NiF_4$ as sorbent/catalyst having high-temperature non-stoichrometric defects are being developed. These processes are referred to as ceramic autothermal recovery processes, or CAR processes, to be discussed further in the Description. They consist of alternately passing air and another medium (or applying vacuum) through pellets or granules of the material in a fixed-bed configuration, with cycle times of the order of minutes or less. Oxygen retained in the solid material during the air contacting step is released by decrease in $O_2$-partial pressure via application of vacuum, steam, carbon dioxide, steam-carbon dioxide mixtures, flue-gas mixtures or other appropriate means, to generate an $O_2$-enriched stream, which is used as feed to other systems, into which CAR could be integrated, e.g., combustion processes.

Key advantages of CAR over ITM processes are ease of material fabrication, plant design and process execution using traditional unit operations. Preliminary estimates indicate significant economic benefits compared to the traditional cryogenic air separation, due to lower energy consumption. On the other hand, cryogenic air separation plants are well understood and, despite their high operating costs, industry momentum is geared toward designing these plants cost-effectively, and this leads to reduced engineering and design costs, and inherent safety built up over time.

One of the key technical issues and risks of the CAR process for $O_2$ enrichment relates to material development. Of the MIEC materials of interest, perovskites and perovskite-like materials have attracted attention in the past. The process-related crystal-structure oxide-ion, $O^{2-}$, deficiency can be exemplified by perovskite-type oxides, which originally referred to the mineral $CaTiO_3$. Today, "perovskite" denotes a series of oxygen-containing compounds with a unique general crystal structure, $ABO_3$, with high-temperature $O^{2-}$ vacancies, denoted by the symbol $\delta$, which obeys the general formula $ABO_{3-\delta}$. The "A"-site cations can be rare earth, alkaline earth, alkaline and other large cations such as $Pb^{2+}$, $Bi^{3+}$, or $Ce^{4+}$, and the "B"-site cations can be 3d, 4d, or 5d transition-metal cations. Multiple cation-type occupations of those two sites are possible. Framework sites "A" and "B" are dodecahedral and octahedral, respectively, cf., L. G. Tejuca and J. L. Fierro, *Properties and Applications of Perovskite-type Oxides*, Marcel Dekker, New York, 1993.

A standard cubic high-temperature perovskite phase remains stable and reversible with regard to changes of $\delta$ within a certain range: The value $\delta$ could be as high as 0.25, but as a rule $\delta$=0.05-0.25 (although higher values have been reported), at elevated temperature and low oxygen partial pressure, i.e., $\delta$ is a function of temperature and partial pressure of oxygen. On the other hand, perovskite stability is governed by cation radii of lattice metals in various valence states combined into a parameter "t" called "tolerance factor", cf., Z. Shao, et al., *Sep. Purif. Technol.*, 25 (2001) 419-42. A perovskite structure can only be formed if t ranges from 0.75-1. These circumstances have set limits to the performance potential of perovskites in $O_2$-recovery and related processes. Tereoka et al. described the material $La_{1-x}Sr_xCo_{1-y}Fe_yO_{3-\delta}$ as a medium for oxide-ion permeation with excellent performance at high temperature (Y. Tereoka et al., *Chemistry Letters*, (1985) 1367-1370; 1743-1746). In this case, the $O_2$ permeation is driven by the $O_2$-partial-pressure difference between the two sides of the membrane, and it results from oxygen-ion transport through the vacant sites in the lattice structure. Significant efforts have been directed to the investigation of the fabrication and utilization of these materials as $O_2$-transport membranes for gas separation and reaction. Mazanec, et al., (U.S. Pat. No. 4,933,054) were awarded a patent in this area in 1990. One recent study of $SrCo_{0.4}Fe_{0.6}O_{3-\delta}$ reported, however, a decrease in oxygen permeability through samples that were purposely made stronger by addition of up to 9 wt % $ZrO_2$, where the $Zr^{4+}$ cations replaced some of the B site cations. Yang, et al., *Effect of the Size and Amount of $ZrO_2$ Addition on Properties of $SrCo_{0.4}Fe_{0.6}O_{3-\delta}$*, AIChE Journal, Vol. 49, Issue 9, pages 2374-2382 (2003).

Desorption of $O_2$ from $La_{1-x}Sr_xCoO_{3-\delta}$ was studied and reported by Nakamura et al. (*Chemistry Letters*, (1981) 1587-1581) in 1981. Later, Teraoka et al. (*Chemistry Letters*, (1985) 1367-1370) examined $O_2$ sorption properties of $La_{1-x}Sr_xCo_{1-y}Fe_yO_{3-\delta}$. They observed that considerable amount of $O_2$ was desorbed from this class of oxides as temperature was increased from 300° C. to 1100° C., and was absorbed as temperature was decreased. Mizusaki et al. (*J. Solid State Chemistry*, 80 (1989) 102) measured the oxygen non-stoichiometry of the perovskite-type oxide $La_{1-x}Sr_xCoO_{3-\delta}$ as function of temperature, Sr content (x)

and O$_2$-partial pressure. Lankhorst and Bouwmeester (*J. Electrochem. Soc.,* 144 (1997) 1268) measured the oxygen non-stoichiometry of La$_{0.8}$Sr$_{0.2}$CoO$_{3-\delta}$. Zeng and Lin (*Solid State Ionics,* 110 (1998) 209-221) investigated O$_2$-sorption and desorption rates of a La$_{0.2}$Sr$_{0.8}$CoO$_{3-\delta}$ sample subjected to sudden changes of O$_2$-partial pressure at constant temperatures. They found that this rate could be correlated to a linear-driving force of the deviation of oxygen-vacancy concentration in the bulk phase of the sample from its corresponding thermodynamically equilibrated one.

Few patents have been issued for processes using the O$_2$-sorption properties of perovskite-type oxides for gas separation and purification. Doi et al., KoKai Patent No. Hei 5(1993)-4044, 1993) disclose using a perovskite-type oxide, ABO$_{3-\delta}$, as high-temperature O$_2$ sorbent to remove O$_2$-containing impurities, such as NO$_X$ by means of a TSA technique to regenerate the sorbent. A Chinese patent application by Yang, et al., Appl. No. 99 1 13004.9, describes a material, Ba$_{0.5}$Sr$_{0.5}$Co$_{0.8}$Fe$_{0.2}$O$_{3-\delta}$, with very high concentration of oxygen vacancies. The CAR concept, developed by Lin, et al., U.S. Pat. No. 6,059,858, also uses perovskite-type oxides as sorbents to separate O$_2$ from an O$_2$-containing stream, particularly air, by a type of mixed TSA-PSA process. This patent also discloses methods of sorbent regeneration using CO$_2$ or steam as the purge gas.

U.S. Pat. No. 6,143,203 describes CAR technology extended to the area of hydrogen and synthesis-gas production using perovskite-type oxide sorbents. See also U.S. Pat. Nos. 6,379,586 and 6,464,955. A material patent of common assignment hereto has also been applied for: *Supported Perovskite-Type Oxides and Methods for Preparation Thereof* by Zeng, et al., U.S. Pub. Pat. Appl., US 2002/0179887 A1 (2002).

As mentioned, the ability of perovskite and perovskite-like materials to function as commercial sorbents has limits. There have been recent efforts to improve the O$_2$-sorption performance of these materials, but with limited success. U.S. Pat. No. 6,772,501 discloses composites of metals and ion conductors; U.S. Pat. No. 6,740,441 discloses using perovskites to thin-film coat "current collects" (metal screens or mesh) in solid oxide fuel cells, and other devices, and gas separations are mentioned; U.S. Pat. Nos. 6,641,626 and 6,471,921 disclose MIEC conducting membranes for HC processing, and disclose ceramic membranes which have good ionic and electrical conductivity, plus excellent strength under reactor operating conditions. The compositions comprise a matrix of MIEC (especially brownmillerite) with one or more second crystal phase, non-conductive, which enhances strength; U.S. Pat. No. 6,541,159 discloses O$_2$-separation membranes having an array of interconnecting pores and an OH$^-$ ion conductor extending through the pores, and an electrical conductor extending through the pores, discrete from the OH$^-$ ion conductor; U.S. Pat. No. 6,440,283 discusses forming pellets, powders, and two layer structures of La/Sr oxides; U.S. Pat. No. 6,146,549 discloses La/Sr ceramic membranes for catalytic membrane reactors with high ionic conduction and low thermal expansion; U.S. Pat. Nos. 5,509,189 and 5,403,461 discuss solid solutions of pyrochlore crystal phase and perovskite crystal structures.

Despite improvements in the art, the need remains for compositions, which take better advantage of the excellent O$_2$-sorption and permeability properties of perovskites and perovskite-like materials, while exhibiting enhanced durability, so that the materials may be used commercially.

SUMMARY OF THE INVENTION

In accordance with the present invention, composite materials and methods of use are presented which reduce or overcome many of the problems of previously known materials.

A first aspect of the invention relates to compositions of matter, specifically composite materials comprising:

(A) one or more crystalline ceramic oxides selected from compounds within general formula (1):

$$A_xA'_{x'}B_yB'_{y'}O_{3-\delta} \tag{1}$$ and (B) one or more crystalline ceramic oxides selected from compounds within general formulas (2), (3), (4), (5), (6), (7), and (8):

$$A_2BO_{4-\delta} \tag{2}$$

$$A_2B_2O_{5-\delta} \tag{3}$$

$$AO(ABO_{3-\delta})_n \tag{4}$$

$$AM_2Cu_3O_{7-\delta} \tag{5}$$

$$Bi_4V_{2(1-x)}Me_{2x}O_{11-3x}, \tag{6}$$

$$A''B''O_3 \tag{7}$$

$$A_2B_2O_{7-\delta} \tag{8}$$

wherein:

A and A' are independently selected from ions of atoms having atomic numbers ranging from 57-71, inclusive, a cation of yttrium, ions of Group 1 atoms, ions of Group 2 atoms, and combinations of two or more, where Group 1 and Group 2 refer to the periodic table of elements;

B, B', and B" are independently selected from d-block transition metal ions;

A" is an ion of Na or Li, and B" is an ion of W or Mo;

M is a metal cation selected from cations of Group 2 atoms of the periodic table of elements;

Me is a metal ion selected from ions of Cu, Bi, and Co atoms;

x+x'=1.0 and y+y'=1.0;

x, x', y, and y' are real numbers independently ranging from about 0.01 to 1.0;

n ranges from 1 to about 10; and

δ ranges from about 0.05 to about 0.30.

One set of composites of the invention are those wherein A is an ion of atoms having atomic number ranging from 57-71, inclusive; A' is an Sr ion; and B and B' are selected from Ni, Co and Fe ions. Another set of composites within the invention are those wherein a crystalline ceramic oxide within general formula (1) $A_xA'_{x'}B_yB'_{y'}O_{3-\delta}$ is combined with a crystalline ceramic oxide within general formula (5) $AM_2Cu_3O_{7-\delta}$.

Composites of the invention may be formed as structured particles having a particle size ranging from about 0.01 to about 100 microns in largest dimension, or ranging from about 0.1 to about 50 microns.

Composites of the invention, when used as oxygen separation media, may be supported on an "active" support selected from porous inorganic materials that are stable at temperatures ranging from about 500 to about 1000° C. In this form the inventive compositions may be referred to as supported composites. "Active"—as that term is used when referring to support or matrix materials—means that even the supporting material acts in the oxygen sorption and transport. Compounds of general formula M'O$_n$ are termed "binary metal oxides", means a single metal element that assumes different oxidation states within the oxygen partial pressure range of the CAR process, enabling the metal oxides to release oxygen at different partial pressures of oxygen in CAR processes. In the binary metal oxides, $M'O_n$, $M'$ is a metal that changes its oxidation state, and $n'$ ranges from about 1 to about 5. Useful metals are Cu, Co, Ni, Bi, Pb, V, Mn, and Cr, the oxides of which release oxygen by changing their crystal phase or by their reduction up to the metal. In their pure states, the binary metal oxides do not form stable ceramic shapes because of crystal phase transformations. However, in combination with an active support or matrix oxide (perovskite materials within general formula (1), perovskite-like materials within general formulas (2), (3), (4), (5), (6), and (7), and pyrochlores within general formula (8)), stability of the binary metal oxides can be enhanced, while extending the oxygen sorption/desorption capacities of the matrix compositions. Other suitable active support materials include apatite compositions.

Supported composites of the invention may be shaped, structured articles of manufacture, having shape selected from beads, pellets, saddles, rings, pyramids, extrudates with any cross sectional shapes with or without holes, honeycombs, with uniform channels and monoliths with random porosity and foam structure, and the like. The inorganic support may be a porous inorganic support comprising a plurality of pores, as further described herein.

A second aspect of the invention are methods of separating a gas component from a mixture of gases by either of pressure swing adsorption, thermal swing absorption, or combination thereof, comprising contacting a gas mixture with a composite of the invention. One set of methods of the invention include converting a light hydrocarbon ($C_5$ or less) into hydrogen and carbon monoxide by contacting one or more hydrocarbons with a composite of the invention, including reactions of partial oxidation, steam reforming, auto-thermal reforming, and the like, in process modes selected from batch, semi-continuous, continuous or cyclic operations. The reactions may be carried out in well-known bed-type reaction vessels, where the bed of particles is fluidized, semi-fluidized, or non-fluidized.

Thus, the present invention provides for novel materials and methods of use, specifically modified mixed ionic-electronic conductor (MIEC) materials (either alone or as composites with active oxygen exchange support materials) with enhanced performance in sorption, catalytic processes, and the like. The inventive composites owe their ionic and electronic conductivities, particularly their oxide-ion mobility and $O_2$-storing capacities, to high-temperature non-stoichiometric defects such as oxide-ion vacancies—or interstitial oxygen sites—in the crystal-lattice structure of the solids, and also on changed valency states of a selected series of transition metals, which lead to different oxides of one and the same metal. These materials will have strong potential for high-temperature processes that utilize the $O_2$-storing/releasing properties for purposes of the enrichment of $O_2$ in gas streams but also for multi-fold catalytic transformations of other compounds. The inventive composites may also be formed into chemically and mechanically robust ceramic composites such as sorbent and membrane materials with high $O_2$ capacities (in the case of absorbents) and high $O_2$ permeation fluxes (in the case of membranes). This enables the design of high-performance structured ceramics of regular or random shapes, allowing for high performance in $O_2$ enrichment and, at the same time, the ability to withstand the expected operating conditions in large scale plants, and be cost-effective in addition.

The inventive composites may be utilized advantageously for high-temperature CAR-type PVSA and TSA processes (and also for other related applications) to produce substantially pure $O_2$, syngas and $H_2$ (at small and large scale), as well as $O_2$ and fuel in integrated process schemes, for example, so-called oxy-fuel processes, power plants, gas turbines, and many other processes.

Further aspects and advantages of the invention will become apparent by reviewing the detailed description of the invention that follows.

DETAILED DESCRIPTION OF THE INVENTION

Novel materials that reversibly deliver $O_2$ in CAR processes and other methods of use are now described in further detail. Primary attention is paid to new composites of two or more oxides that act reversibly with high exchange rate and high capacity for $O_2$ over a $O_2$-partial pressure region between 5 and 0.01 atmosphere. Beside these parameters, their chemical and long-time mechanical stability under the conditions of commercial processes, with maintenance of both the desired crystal structure and secondary ceramic shape, specifically by considering chemical reaction with gases and thermal expansion coefficients as important material-specific parameters, are accounted for.

Composites of the invention may generally be categorized as combinations (solid solutions) of a first compound in the perovskite class of compounds within the general formula $A_xA'_{x'}B_yB'_{y'}O_{3-\delta}$ and two or more "perovskite-related" compounds within general formulas (2), (3), (4), (5), (6), (7), or a pyrochlore within general formula (8) as detailed herein, where framework sites "A" are dodecahedral and "B" are octahedral. As mentioned in the background section, a standard cubic high-temperature (about 600-1200° C.) perovskite phase remains stable and reversible with regard to changes of $\delta$ within $\delta=0.05$-$0.25$ at elevated temperature and low oxygen partial pressure. On the other hand, perovskite stability is governed by cation radii of lattice metals in various valence states combined into a parameter "t" called "tolerance factor", and a perovskite structure can only be formed if t ranges from 0.75-1. These circumstances have set limits to the performance potential of perovskites in $O_2$-recovery and related processes. Attempts to extend the limits of useful perovskites have failed, at least as far as oxygen permeability is concerned. For example, when a perovskite material was purposely made stronger by addition of $ZrO_2$, where the $Zr^{4+}$ cations replaced some of the B site cations, the material was stronger, but the oxygen permeability decreased. Yang, et al., *Effect of the Size and Amount of $ZrO_2$ Addition on Properties of $SrCo_{0.4}Fe_{0.6}O_{3-\delta}$*, AIChE Journal, Vol. 49, Issue 9, pages 2374-2382 (2003).

The inventors herein have discovered that composite materials of the invention overcome some or all the limitations of previous compositions in enhancing oxygen permeability and oxygen trapping ability. As may be seen from the above general description of composites of the invention, the key to the effectiveness of the compositions of the invention lies in the selection of the B site cations; in particular, it appears that the ability of Fe, Co, Ni, Cu, Cr and Mn cations to be present in more than one oxidation state in the crystal lattice at high temperatures allows, the compositions of the invention to be particularly useful in temporarily absorbing oxygen, especially in certain unexpected combinations of perovskites with perovskite-related structures. It is also theorized that the ionic radii of the selected cations in their various oxidation states, and the fluctuation between these states and radii, perhaps help in the generation of oxide ion vacancies in the crystal lattice. Furthermore, it is theorized that the presence of perovskite-related solids in close proximity to perovskite structure within the composites of the invention helps in surface effects. The valency states of the various transition metals deemed useful in the composites of the invention, and the ionic radii of the most stable ion, are presented in Table 1, in accordance with R.D. Shannon, *Acta Cryst.*, A32 (1976) 751-767. The ionic and electronic conductivities of these compositions, particularly their oxide-ion mobility, and oxygen-($O_2$)-storing capacities that are based on high-temperature non-stoichiometric defects such as oxide ion vacancies, or interstitial oxygen sites, in the crystal-lattice structures of these solids, makes composites of the invention particularly useful in oxygen separation.

TABLE 1

Valancy States and Ionic Radii

| Atomic Number | Symbol | Possible Oxidation States | Ionic radii (pm)* |
|---|---|---|---|
| 24 | Cr | 2, 3*, 4, 5, 6 | 62 |
| 25 | Mn | 7, 6, 4, 3, 2* | 67 |
| 26 | Fe | 2, 3* | 55 |
| 27 | Co | 2*, 3 | 65 |
| 28 | Ni | 2*, 3 | 69 |
| 29 | Cu | 2*, 1 | 73 |

*Most stable cation

One group of perovskites useful in composites of the invention are those wherein A is an ion of atoms having atomic number ranging from 57-71, inclusive; A' is an Sr ion; and B and B' are selected from Ni, Co and Fe ions. Other perovskite oxides useful in the invention within general formula (1) $A_xA'_{x'}B_yB'_{y'}O_{3-\delta}$ are those wherein $0.5<x<1$, $0.1<x'<0.5$, $0.2<y<0.8$, and $0.2<y'<0.6$. Some specific perovskite oxides useful in the invention include those in Table 2.

Perovskite-related compounds within general formulas (2)-(8) suitable for use in the compositions of the invention are also listed in Table 2.

TABLE 2

Perovskite and Perovskite-related compounds

| Perovskites: | $A_xA'_{x'}B_yB'_{y'}O_{3-\delta}$ | (1) |
|---|---|---|
| | $La_{0.6}Sr_{0.4}Co_{0.8}Fe_{0.2}O_{3-\delta}$, | |
| | $Sr_{0.9}Ce_{0.1}Fe_{0.8}Co_{0.2}O_{3-\delta}$, | |
| | $La_{0.2}Sr_{0.8}Co_{0.6}Fe_{0.4}O_{3-\delta}$, and | |
| | $Ba_{0.5}Sr_{0.5}Co_{0.8}Fe_{0.2}O_{3-\delta}$ | |
| | $Ca_{0.5}Sr_{0.5}Mn_{0.8}Fe_{0.2}O_{3-\delta}$ | |
| | $Ca_{0.45}Sr_{0.45}Mn_{0.8}Fe_{0.2}O_{3-\delta}$ | |
| | $La_{0.6}Sr_{0.4}Cr_{0.2}Fe_{0.8}O_{3-\delta}$ | |
| Perovskite-related: | | |
| | $A_2BO_{4-\delta}$ | (2) |
| | $La_2CoO_{4-\delta}$ | |
| | $La_2MnO_{4-\delta}$ | |
| | $La_2FeO_{4-\delta}$ | |
| | $Sr_2CuO_{4-\delta}$ | |
| | $Sr_2MnO_{4-\delta}$ | |
| | $A_2B_2O_{5-\delta}$ | (3) |
| | $La_2Co_2O_{5-\delta}$ | |
| | $La_2Mn_2O_{5-\delta}$ | |
| | $Sr_2Cr_2O_{5-\delta}$ | |
| | $Ce_2Mn_2O_{5-\delta}$ | |
| | $AO(ABO_{3-\delta})_n$ | (4) |
| | $LaO(LaCuO_{3-\delta})_5$ | |
| | $SrO(LaCrO_{3-\delta})_6$ | |
| | $GdO(SrFeO_{3-\delta})_5$ | |
| | $CeO(LaNiO_{3-\delta})_6$ | |
| | $AM_2Cu_3O_{7-\delta}$ | (5) |
| | $Y_{0.5}La_{0.5}BaCaCu_3O_{7-\delta}$ | |
| | $Y_{0.8}La_{0.2}Ba_{0.8}Sr_{1.2}Cu_3O_{7-\delta}$ | |
| | $Y_{0.7}La_{0.3}Ba_{0.8}Sr_{1.2}Cu_3O_{7-\delta}$ | |
| | $Y_{0.9}La_{0.1}Ba_{0.6}Ca_{0.6}Sr_{0.8}Cu_3O_{7-\delta}$ | |
| | $CeBa_2Cu_3O_{7-\delta}$ | |
| | $Bi_4V_{2(1-x)}Me_{2x}O_{11-3x}$, | (6) |
| | $Bi_4VCuO_{9.5}$ | |
| | $Bi_4V_{0.6}Co_{1.4}O_{8.9}$ | |
| | $Bi_4V_{1.4}Bi_{0.6}O_{10.1}$ | |
| | $Bi_4V_{1.6}Cu_{0.4}O_{10.4}$ | |
| | $A''B''O_3$ | (7) |
| | $LaFeO_3$ | |
| | $SrCoO_3$ | |
| | $SrFeO_3$ | |
| Pyrochlores: | | |
| | $A_2B_2O_{7-\delta}$ | (8) |
| | $Mg_2Fe_2O_{7-\delta}$ | |
| | $Mg_2Co_2O_{7-\delta}$ | |
| | $Sr_2Mo_2O_{7-\delta}$ | |

One group of composites of the invention include compositions within general formula (5), particularly $YBa_2Cu_3O_{7-\delta}$ and doped versions thereof, such as $Y_{1-x}La_xBa_{2-y}Sr_yCu_3O_{7-\delta}$ and $Y_{1-x}La_xBa_{2-y}Ca_yCu_3O_{7-\delta}$, wherein x ranges from 0 to about 1, and y ranges from about 0.5 to about 1.5. The materials within general formula (5) comprise a selection of 1,2,3-type superconductor compounds. They are specifically Rare Earth (RE)-1,2,3-type superconductors, e.g., $(RE)M_2Cu_3O_{7-\delta}$, with a molar ratio RE-Ba—Cu=1:2:3, specifically, $YBa_2Cu_3O_{7-\delta}$, with Y—Ba—Cu=1:2:3, wherein partial substitution by appropriate dopants of their basic metal components RE and barium, Ba, may be envisioned, in addition. For the purpose of this invention, they do not need to show any superconductivity properties. One group of dopants useful for the purposes of the invention are lanthanide metal dopants such as lanthanum, La, praseodymium, Pr, gadolinium, Gd, and holmium, Ho.

The structure of the 1,2,3-type superconductor-type materials contains in particular perovskite-like structural units as mentioned above. Therein are systematic oxygen-atom vacancies in the unit cell compared to a stack of simple perovskite unit cells. These vacancies occur between adjacent copper atoms in the $CuO_3$ chains along the crystallographic c axis. The vacancies are in the RE, specifically yttrium-atom plane. There are also additional vacancies between Cu atoms along the crystallographic a axis in the Cu-and-O planes that lie between the planes of Ba atoms. The stoichiometry seems to be odd, viz., $(RE)M_2Cu_3O_{7-\delta}$, which results from additional oxygen vacancies (defect structure), at certain sites such that it holds $0.0<\delta<0.4$. For $YBa_2Cu_3O_{7-\delta}$, usually $\delta=0.19$, within the temperature regi of superconductivity, i.e., ($100\pm20$) K. It is well known, however, that $\delta$ is a function of temperature. The defect structure gets increasingly pronounced with temperature, and since utilization of the materials of this invention would take place at high temperature, the assessed utilization is based on the reasonable assumption of $0.2<\delta<0.4$. Additionally, the parameter $\delta$ is assumed to depend on $O_2$ partial pressure as well.

For the specific purpose of this invention, the inventive materials within the general formula $(RE)M_2Cu_3O_{7-\delta}$, have been shown in testing to have $O_2$ "working" sorption capacities larger by factors ranging from about 3 to about 10 times higher for CAR, compared to the currently known materials, at given constant $O_2$ pressure ratios. The following related properties of a $(RE)M_2Cu_3O_{7-\delta}$, viz., $YBa_2Cu_3O_{7-\delta}$, have been assessed:

The working sorption capacity of $YBa_2Cu_3O_{7-\delta}$ in CAR processes named, exceeds that of perovskite $La_{0.2}Sr_{0.8}Co_{0.6}Fe_{0.4}O_{3-\delta}$, by a factor of ca. 4 (at the time being, the assessment method does not allow for conclusions regarding the $O_2$ isotherm shape, ie., for "working" capacities over certain $O_2$-pressure ranges). However, reasons exist to assume that the "working" capacity would be increased by a factor of ca. 3, depending on process-temperature regime;

By utilizing materials of the formula $YBa_2Cu_3O_{7-\delta}$, it has been shown that we can decrease significantly the temperature at which a CAR process is executed, i.e., currently at ca. 850° C. A process-temperature ranging from about 500 to about 650° C. is now possible. This eases tremendously issues of heat management, with which CAR technology was heretofore weighed down, in general;

The existence of high-temperature order-disorder transitions in all compositions of the invention, but in particular compositions within the general formula $(RE)M_2Cu_3O_{7-\delta}$, are of further advantage to optimize heat-management issues in CAR processes;

Strong reasons exist to conclude that $O_2$ transport rate in $(RE)M_2Cu_3O_{7-\delta}$ structures are distinctly higher than in $La_{0.2}Sr_{0.8}Co_{0.6}Fe_{0.4}O_{3-\delta}$ perovskite structures utilizable for CAR.

Doping the specific material $YBa_2Cu_3O_{7-\delta}$ with other cations of the types RE and M, for example, those of lanthanum and calcium, strontium, respectively, increases significantly the chemical stability of it but also the mechanical strengths of the resulting specimens. The latter purpose could also be achieved by incorporating titanium cation.

Perovskites within general formula (1) may be present with one or more perovskite-related compounds within general formulas (2)-(7) and pyrochlores within general formula (8) in a variety of formats, including, but not limited to, solid solutions, layered compositions, randomly mixed compositions, and the like. For example, a perovskite may be present with a perovskite-related compound as intergrown layers, or as discrete layers. As examples of these: $La_{0.6}Sr_{0.4}Co_{0.8}Fe_{0.2}O_{3-\delta}$ in alternating or intergrown layers with $La_2CoO_{4-\delta}$; $La_{0.6}Sr_{0.4}Co_{0.8}Fe_{0.2}O_{3-\delta}$ in alternating or intergrown layers with $Mg_2Fe_2O_{7-\delta}$; $Sr_{0.9}Ce_{0.1}Fe_{0.8}Co_{0.2}O_{3-\delta}$ in alternating or intergrown layers with $Sr_2Mo_2O_{7-\delta}$. Multiple layers are possible, with alternating layers of two or more of the inventive crystalline ceramic oxides. These compositions of the invention may be comprised of alternating and densely packed thin layers of crystalline ceramic oxides of the invention. Such arrangements allow for (i) buffering thermal-mechanical properties, (ii) increasing the surface-reaction rate by enhancing the accessible surface and the influence of grain-boundary region effects, and (iii) synergistic effects for increasing the "working capacity" of the materials.

Figure 1:
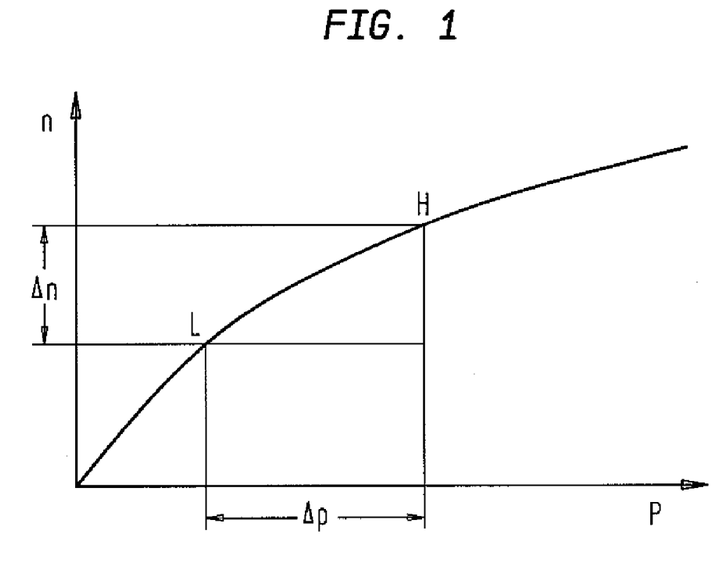
FIGS. 1 and 2 illustrate graphically the concept of working capacity for sorbent materials of the invention.
Figure 2:
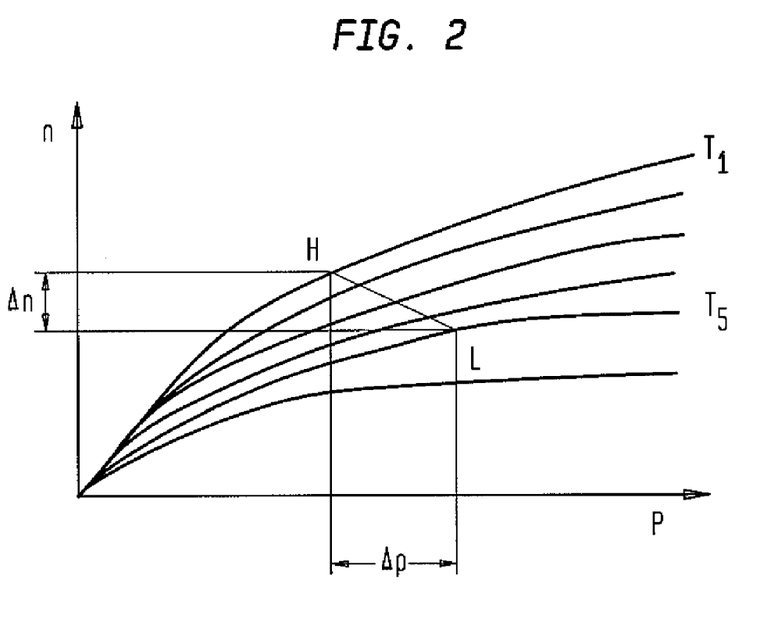

The meaning of the process parameter "working capacity" follows from FIGS. 1 and 2 that illustrate by sorption-isotherm schemes the sorption-process principles TSA (Thermal Swing Absorption) and PSA (Pressure Swing Adsorption), respectively. A CAR process could be thought to be executed at conditions limited by these two principles. FIG. 1 illustrates graphically a pressure swing adsorption (PSA) scheme. (A similar figure would express a vacuum swing adsorption (VSA) scheme, which those of skill in the art will recognize is another method useful in practicing the invention.) In a PSA scheme, adsorption of the desired species (typically $O_2$) by pressure build-up at constant temperature leads to point H. Desorption using either pressure decrease (or vacuum) or partial pressure decrease in the desired species (using a replacement or sweep gas) at constant temperature leads the system to point L. The resulting difference is sorption uptake as shown at the ordinate is $\Delta n$ over the difference in (partial) pressure $\Delta p$. The difference $\Delta n$ represents the so-called "working capacity" (or desorbable amount of target species over a defined oxygen partial pressure range). This cycle is typically repeated one or a plurality of times. FIG. 2 illustrates graphically a temperature swing adsorption (TSA) scheme. Adsorption of the desired species (typically $O_2$) by pressure build-up at constant temperature $T_1$ leads to point H. Desorption using temperature increase, e.g., towards T5 with (or without) some pressure increase, leads the system to point L. Desorption may be supported by purge in conjunction with temperature increase using a fluid species that is less strongly sorbed than the target species. The resulting working capacity of the sorbent material is illustrated as the desorbed amount of target species, $\Delta n$. This cycle is typically repeated one or a plurality of times.

Composites of the invention may be formed as particles having a particle size ranging from about 0.01 to about 100 microns in largest diameter, or range from about 0.1 to about 50 microns. The particles may be shaped articles of manufacture, having shape selected from beads, pellets, saddles, rings, pyramids, cubes, extrudates with any cross sectional shapes with or without holes, honey-combs with uniform channels and monoliths with random porosity and foam structure, and the like.

Composites of the invention may be made and characterized using standard ceramic processing steps and equipment. For example, to make a composite of $La_{0.6}Sr_{0.4}Co_{0.8}Fe_{0.2}O_{3-\delta}$ and $La_2CoO_{4-\delta}$, one might start with technical of each rare earth oxide and metal oxide required. Stoichiometric amounts of each oxide required to produce $La_{0.6}Sr_{0.4}Co_{0.8}Fe_{0.2}O_{3-\delta}$ are well mixed using an agate and pestle. In a separate agate and pestle are mixed stoichiometric amounts of each oxide required to produce $La_2CoO_{4-\delta}$. The separate mixtures would then be mixed or layered as desired to form a "green" composite, and then fired at a high temperature, usually about 1000° C. The fired composite is then pressed together into the desired shapes under pressure, and then sintered to make the dense material. The structure of the individual powders and the final shaped articles may be studied using XRD employing a diffractometer such as that known under the trade designation D/Max-RB, available from Rigaku. Oxygen temperature-programmed desorption equipment is readily available. A heating rate of 10° C./min is typical. Oxygen permeation of membrane materials may be studied using known gas chromatography (GC) techniques. For example, a disk of the sintered material may be sealed in the end of an alumina tube, one side of the disk exposed to air, the other exposed to flowing helium. The outlet gas (He+O$_2$) is connected to the GC, for example a GC available from Hewlett-Packard known under the trade designation HP5890A. The GC is calibrated frequently using standard gases. The O$_2$ permeation flux (J$_{O2}$) may be calculated from known equations, such as the following:

$$J_{O2} = S/S° \times P° \times F/S_m,$$

where S is the oxygen area of the outlet gas, S° the oxygen area of the standard gas, P° the percentage of O$_2$ in the standard gas, F the outlet gas flow rate and S$_m$ the effective inner surface area of the membrane material.

Composites of the invention, as described herein comprise a portion of an (A) component and a portion a (B) component. The (A) component is one or more crystalline ceramic oxides selected from compounds within general formula (1):

$$A_x A'_{x'} B_y B'_{y'} O_{3-\delta} \quad (1)$$

while the (B) component is one or more crystalline ceramic oxides selected from compounds within general formulas (2), (3), (4), (5), (6), (7), and (8):

$$A_2 BO_{4-\delta} \quad (2)$$

$$A_2 B_2 O_{5-\delta} \quad (3)$$

$$AO(ABO_{3-\delta})_n \quad (4)$$

$$AM_2 Cu_3 O_{7-\delta} \quad (5)$$

$$Bi_4 V_{2(1-x)} Me_{2x} O_{11-3x}, \quad (6)$$

$$A''B''O_3 \quad (7)$$

$$A_2 B_2 O_{7-\delta} \quad (8).$$

The ratio of component A to component B in the final composite will of course depend on the end use, including the physical, chemical, and thermal environment the composite is exposed to, and the cycling of temperature and/or pressure that is expected to occur in various processes. Generally speaking, the weight ratio A:B may range from about 100:1 to about 1:100, or range from about 10:1 to about 1:10. A particular advantage of composites of the invention is the ability to modify the composition within each A and each B component, as well as the ratio A:B and physical form of each of A and B, to meet demands imposed by the end use. There may also be environmental reasons for selecting a particular A or B component, such as disposal constraints.

The crystalline ceramic oxides of the invention may be supported on an "active" support selected from porous inorganic materials that are stable at temperatures ranging from about 500 to about 1000° C. In this form the inventive composites may be referred to as supported crystalline ceramic oxides, or simply secondary composites, and these materials are particularly well-suited for high-temperature CAR-type processes for O$_2$ enrichment. Recall that primary compositional changes/doping of basic perovskite-type materials to improve their properties with regard to oxygen exchange have reached their limits. As used herein, the term "secondary composite" means mechanical combinations on a macro scale of two or more solid materials, one of which is itself a composite (a primary composite) of components A and B as discussed herein, resulting in compositions with specific goal-oriented macroscopic properties. The phenomenon of building up/using secondary composites allows for significant unexpected (i) additional O$_2$-exchange capacity; (ii) improved thermo-chemical properties; (iii) appropriate changes in surface-reaction rates; and (iv) improved ceramic-material processing.

Examples of secondary composites of the invention include compositions where the "core" O$_2$-exchange material and the matrix (support) material are both active with regard to O$_2$-exchange. For example, secondary composites of this invention include one or more composites comprising A and B components combined with an oxygen-exchange active matrix, which may be an oxide such as another perovskite that is slightly active, but contributes desirable mechanical and thermal properties to the composite. Composites of the invention optionally include a stabilizing component. It is anticipated that for most composites of the invention an appropriate binder will have to be utilized.

The stabilizing component functions to maintain the ability of the composition to undergo repeated cyclic changes in its crystal structure as temperature, pressure, or both are cycled. Suitable stabilizers are rare earth (lanthanides series) elements and their oxides, such as erbium and erbium oxide.

Binders function to maintain the intended physical shape of the composites of the invention under the constraints of the conditions of use. These constraints include chemical, electrical, and mechanical, and suitable binders are materials that substantially match the chemical, electrical, mechanical, and thermo-mechanical properties of the crystalline ceramic oxides and active support materials. In particular for non-membrane CAR extrudates to be used under pressure-swing conditions, the binder should allow composites of the invention to achieve a crush strength of at least about 3 kg/cm$^2$, or at least about 5 kg/cm$^2$, as tested by specific techniques and criteria the particular features of which depend greatly on both the shape and geometry of the particles investigated. Specifically, "buffering" of the thermal-expansion coefficient at O$^-$ deficiency conditions (for crystals) allows for maximum $\Delta\delta$ to be utilized by substantially reducing or eliminating the thermo-mechanical-stress gradient across the CAR-type macroscopic particle. The mechanical strength of composites of the invention under operating conditions may be improved, for example, by choosing appropriate supports, inert fillers, fibers and the like. Suitable binders may or may not be chemically active, and include metal oxides that do not undergo significant change in oxidation state, examples of which include the various aluminas, silicas, titanias and zirconia. These materials are well known in the ceramics art.

Useful active supports for the invention may be perovskite-like compounds within general formulas (1), (2), (3), (4), (5), (6), (7), and (8), and combinations thereof. The active support may have a particle size (largest dimension) ranging from about 1 to about 10,000 microns, or range from about 10 to about 1,000 microns. When a binary metal oxide is present with a primary composite of the invention, the binary metal oxide may overlay the primary composite, and the binary metal oxide may have a crystallite size ranging from about 0.1 to about 0.5 microns. Secondary composites of the invention are shaped articles of manufacture, having shape selected from beads, rings, pyramids, extrudates with any cross sectional shapes with or without holes, honeycombs with uniform channels and monoliths with random porosity and foam structure, and the like.

As with the primary composites of the invention having two or more crystalline ceramic oxides present, secondary composites of the invention may be comprised of alternating and densely packed thin layers of oxygen-exchange active materials. Such arrangements provide for an opportunity to (i) buffer thermal-mechanical properties, (ii) increase the surface-reaction rate by enhancing the accessible surface, and also the influence of grain-boundary region effects, (iii) provide for synergistic effects for increasing the "working capacity" of the material.

Intimately arranged physical mixtures of crystallographically incompatible structures also have utility as dual-compounded composite materials of the invention. For example, one or more primary composite of the invention may be physically dry mixed with another primary composite, or alternatively with an active matrix material of the type mentioned herein, with optional binder and stabilizer materials.

Specific macroscopic size and system properties of primary and secondary composites of the invention of physical/physico-chemical nature that have an unexpected strong (positive) influence on enhanced $O_2$-exchange capacity, including improved thermo-chemical properties and accelerated surface-reaction rate are as follows:

(1) increase in "working capacity" along the $O_2$-sorption isotherm (by appropriate change of its slope) via mixing effects with additional synergies (for example, enhancement of surface reaction) and by combining $O_2$-exchange active support materials into composites with crystalline ceramic oxides of the invention, which show differences in their active $O_2$-partial-pressure regions (select active support materials having high $O^{2-}$ capacity and optionally a linear sorption isotherm in order to ensure an increased $\Delta O_2$ loading, and its utilization under CAR-operating conditions);

(2) doping of the perovskite-type material of the general formula $ABa_2Cu_3O_{7-\delta}$ with all the possible variations in decoding A, for several examples, with all the possible variations in decoding A, for several examples, or other materials to vary either the surface-exchange rate for $O_2$ or the rate of chemical oxide-ion diffusion to allow for a process regime along "non-equilibrium" isotherms, and increasing, thus, the working capacity, even if the total $O_2$ capacity remains unchanged/comparatively low. Particularly, this could be achieved by decreasing the surface reaction rate at constant high chemical diffusivity (in the crystalline bulk of the exchange-active material);

(3) creating an additional regular macropore-channel system in secondary single-component perovskite and/or composite particles, such as extrudates, pellets, and the like, (cf., W. Geipel and H J. Ullrich, *Füllkörper-Taschenbuch*, Vulkan Verlag, Essen, 1991; and R. J. Wijngaarden, A. Kronberg, K. R. Westerterp, *Industrial Catalysis*, Wiley-VCh, Weinheim, 1998) and avoiding formation of mesoporosity with Knudsen-type transport by utilizing auxiliary pore-forming materials, for example, of organic character, in the making of secondary-material shapes that leads to a stochastic macroporosity only. Organic components of sufficient large size, such as naphthalene and/or naphthalene-based compounds, which consist of carbon and hydrogen only, to be burned off completely without strong side reactions, are desirable for this purpose. However, concentration of pore-creating additives has to be balanced with regard to efficient removal of $CO_2$ formed, which could be detrimental to specific perovskite-type materials;

(4) improving the macro-kinetics of CAR processes by utilizing shape effects in secondary single-component material and/or composite particles (combining these with enhancement factors that stem from the additional regular macropore-channel system.);

(5) create "dispersion effects" on external surfaces of crystalline ceramic oxides or composite particles to enhance the surface-exchange rate;

(6) select crystalline ceramic oxide crystallite size distributions with their maxima shifted toward lower or higher crystal sizes, depending on typical rate processes that have to be identified and characterized for finding composition-specific optima); and (7) utilize tribochemical and acid-treatment methods to activate external surface-area regions of crystalline ceramic oxides and composites including same for enhancing surface reaction by minimizing the surface barrier.

Secondary composites of the invention may vary greatly in terms of ratio of composition of the two components (ratio of mass or volume of core oxygen exchange material (primary composite of A and B components) to mass or volume of matrix or support material). This ratio may vary from about 1:100 to about 1:10. The particle size for any particular composite (primary and secondary) of the invention may vary over a large particle size distribution or a narrow particle size distribution, expressed in terms of Gaussian distribution curves.

Secondary composites of the invention are prepared by means known to those of skill in the ceramics art. They may be prepared by dispersing a primary composite of the invention onto an active support with or without the aid of a liquid solvent, and treating the combination at a temperature ranging from about 600 to about 1,500° C. The active inorganic support may be a porous inorganic material comprising a plurality of pores. The porous structure may be formed from a green composition comprising additives useful in forming pores in the porous inorganic material and useful to control pore structure of the pores, such as water, organic solvents, celluloses, polymers, synthetic and naturally formed fibers, starches, metal oxides, and the like, and combinations thereof. Additives may be selected from water, celluloses, about 0.1 to 1 wt % MgO and about 0.1 to 0.5 wt % $TiO_2$. Pore sizes may range from about 0.001 to 10 microns, or range from 0.01 to 1 micron, and specific surface area may range from about 1 to 200 $m^2/g$, or range from 1 to 50 $m^2/g$.

Methods of Use

A second aspect of the invention are methods of separating a gas component from a mixture of gases by either of pressure swing adsorption, thermal swing absorption, or combination thereof comprising contacting a gas mixture with a primary or secondary composite of the invention. One group of methods of the invention are those wherein the sorbed oxygen may then be used in situ for reacting with another compound while still sorbed, or desorbed and subsequently reacted, or combination of these (for example the oxygen may be desorbed from the compositions of the invention contained in a vessel and subsequently reacted, in the same vessel, with a compound to be oxidized). If used in thin membrane form, the composites of the invention may serve as mixed ion and electron conductors, where $O_2$ atoms contacting one side of the membrane accept 2 electrons conducted through the membrane to form $O^{2-}$ ions, while a hydrocarbon flows past the other side of the membrane and reacts with $O^{2-}$ ions conducted through the membrane to form CO, $H_2$ and release 2 electrons. Reactions using the oxygen so adsorbed or recovered, such as partial hydrocarbon oxidation, hydrocarbon steam reforming, hydrocarbon auto-thermal reforming, and the like, in either batch, semi-continuous, continuous or cyclic operations, are considered within the invention. Aside from the use of the composites of the invention in these methods, the methods are themselves known to skilled artisans. For example, the method descriptions in U.S. Pat. Nos. 6,143,203; 6,379,586 and 6,464,955, and U.S. Pub. Pat. Appl., 2002/0179887 A1 are incorporated herein by reference.

Methods of the invention include converting a light hydrocarbon ($C_5$ or less) into hydrogen and carbon monoxide by contacting one or more hydrocarbons with a particulate composite (primary or secondary composite) of the invention, carried out in well-known bed-type reaction vessels, where the bed of particles is fluidized, semi-fluidized, or non-fluidized. Alternatively, membrane configurations may be employed, as discussed above. Partial hydrocarbon oxidation reactions are advantageous in that they are exothermic, and typically carried out at temperatures ranging from about 600 to about 1200° C. In these temperature regimes, the compositions and composites of the invention are well-suited, since the high temperature perovskite cubic structure predominates.

Figure 3:
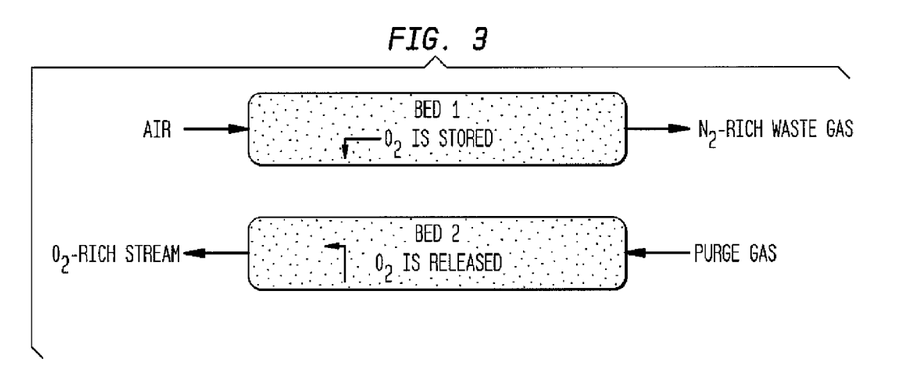
FIG. 3 is a schematic representation of a ceramic autothermal recovery process of the invention.

CAR is a Ceramic Auto-thermal Recovery process executed cyclically on conventionally shaped perovskites or related solids in a fixed-bed sorption-type arrangement at high temperature; as a rule at T>700° C. One scheme, illustrated in FIG. 3, illustrates a two-bed system that is run symmetrically. While exothermic sorption uptake of oxygen takes place in Bed 1 by passing air through it with a nitrogen-enriched waste gas leaving the bed, endothermic desorption of oxygen and its release as an oxygen-enriched product gas stream takes place in Bed 2, due to oxygen partial pressure decrease as a result of purging the bed with an inert gas. Appropriate heat management of the process system allows for overall autothermal conditions.

EXAMPLES

Example 1

Oxygen sorption-desorption characteristics such as exchange-capacity data was measured by means of a home-built technique that utilized a Lambda sensor for oxygen detection and analysis. The Lambda sensor used was of type LSU 4.2 of the Bosch Company (Germany) with a voltage chosen at 0.6 V. At this voltage, the current does not depend on voltage. Calibration took place with mixtures of dry air and argon to arrive at oxygen concentrations between 1 vol. % and 21 vol. % (air). This resulted in a linear dependence between oxygen concentration in the gas and the current that passes the sensor. The gas flow could be switched between air (oxygen sorption uptake) and argon (with about 10 ppm oxygen trace content) (oxygen desorption/release). The temperature was kept at 800° C., in all experiments. Gas flow rates were established/measured at 6 l/hr for both air and argon.

Figure 4:
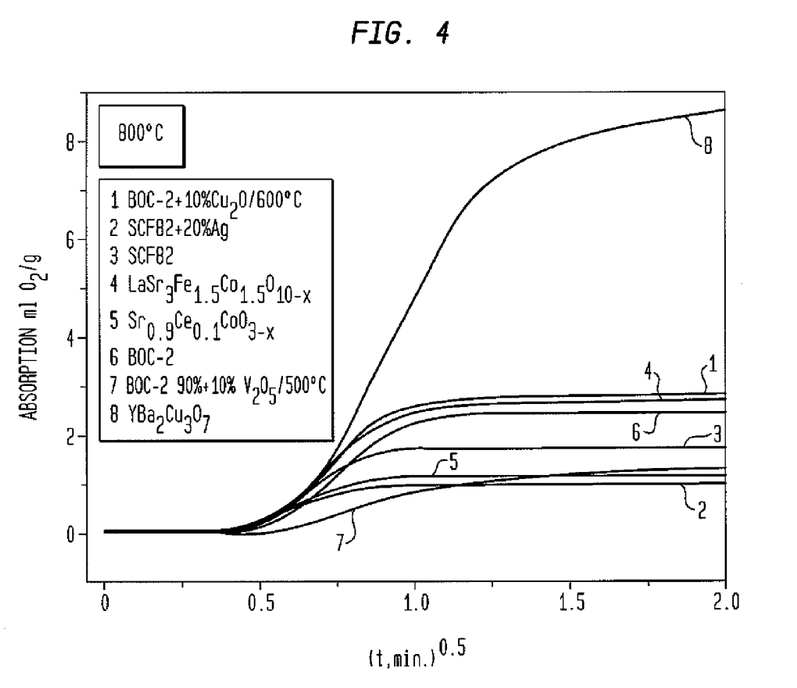
FIG. 4 shows plots of oxygen uptake/release (ml $g^{-1}$) vs. square root of time ($min^{0.5}$) for compositions of the invention.

Results of these experiments are shown in FIG. 4 as plots of oxygen uptake/release (ml $g^{-1}$) vs. square root of time ($min^{0.5}$). For purposes of screening and characterization, a series of mixed oxides of various types were investigated. Without addressing specific details at this instance it could be concluded from these measurements, that the perovskite-type material $YBa_2Cu_3O_{7-\delta}$ allows for the highest reversible oxygen uptake at a temperature of 800° C. It exceeded that of the material, $La_{0.2}Sr_{0.8}Co_{0.6}Fe_{0.4}O_{3-\delta}$, by a factor of 3 to 4, with a "working capacity" exceeding that of the latter material by a factor of (3-5).

Example 2

Figure 5:
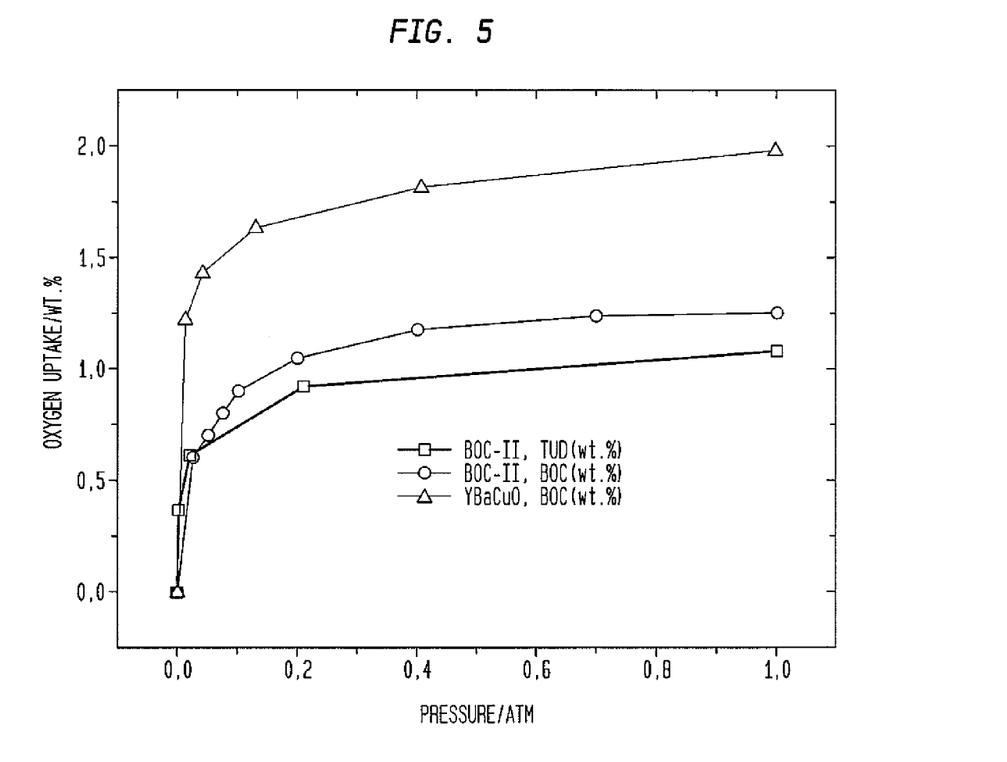
FIG. 5 demonstrates graphically a comparison of sorption isotherms for oxygen between two materials, $YBa_2Cu_3O_{7-\delta}$ and $La_{0.2}Sr_{0.8}Co_{0.6}Fe_{0.4}O_{3-\delta}$.

FIG. 5 shows oxygen sorption isotherms measured at 800° C. on two different perovskite compositions, viz., $La_{0.2}Sr_{0.8}Co_{0.6}Fe_{0.4}O_{3-\delta}$ and $YBa_2Cu_3O_{7-\delta}$, i.e., plots of oxygen uptake expressed in terms of weight percentage, wt. %, vs. oxygen partial pressure at constant temperature. These isotherms were obtained by means of a home-built high-temperature gravimetric spring-balance technique, the principle of which is described, for example, in F. Rouquerol, J. Rouquerol, K. Sing, "Adsorption by Powders and Porous Solids", Academic Press, London, 1999, p.60.

FIG. 5 demonstrates sufficiently close oxygen-isotherm-curve courses for the BOC-II materials prepared either in-house (denoted as BOC) or at the Technical University of Dresden (Germany) (denoted as TUD). The material coded as YbaCuO, which stands for a perovskite of the chemical composition $YBa_2Cu_3O_{7-\delta}$, exceeds $La_{0.2}Sr_{0.8}Co_{0.6}Fe_{0.4}O_{3-\delta}$ both in its absolute sorption uptake and "working capacity". A comparison of isotherms for oxygen between these two materials allows to select partial pressure differences as such that the "working capacity", $\Delta n$, on YBaCuO exceeds that of $La_{0.2}Sr_{0.8}Co_{0.6}Fe_{0.4}O_{3-\delta}$ by a factor of three, at least.

These results offer several options to enhance CAR-process performance efficiency: (1) reducing sorbent mass and adsorber sizes by about factor 3 if keeping constant all the other process parameters; (2) maximizing the cycling frequency of CAR processes towards their kinetic limits; (3) maximizing yield and specific product of overall processes.

Example 3

Figure 6:
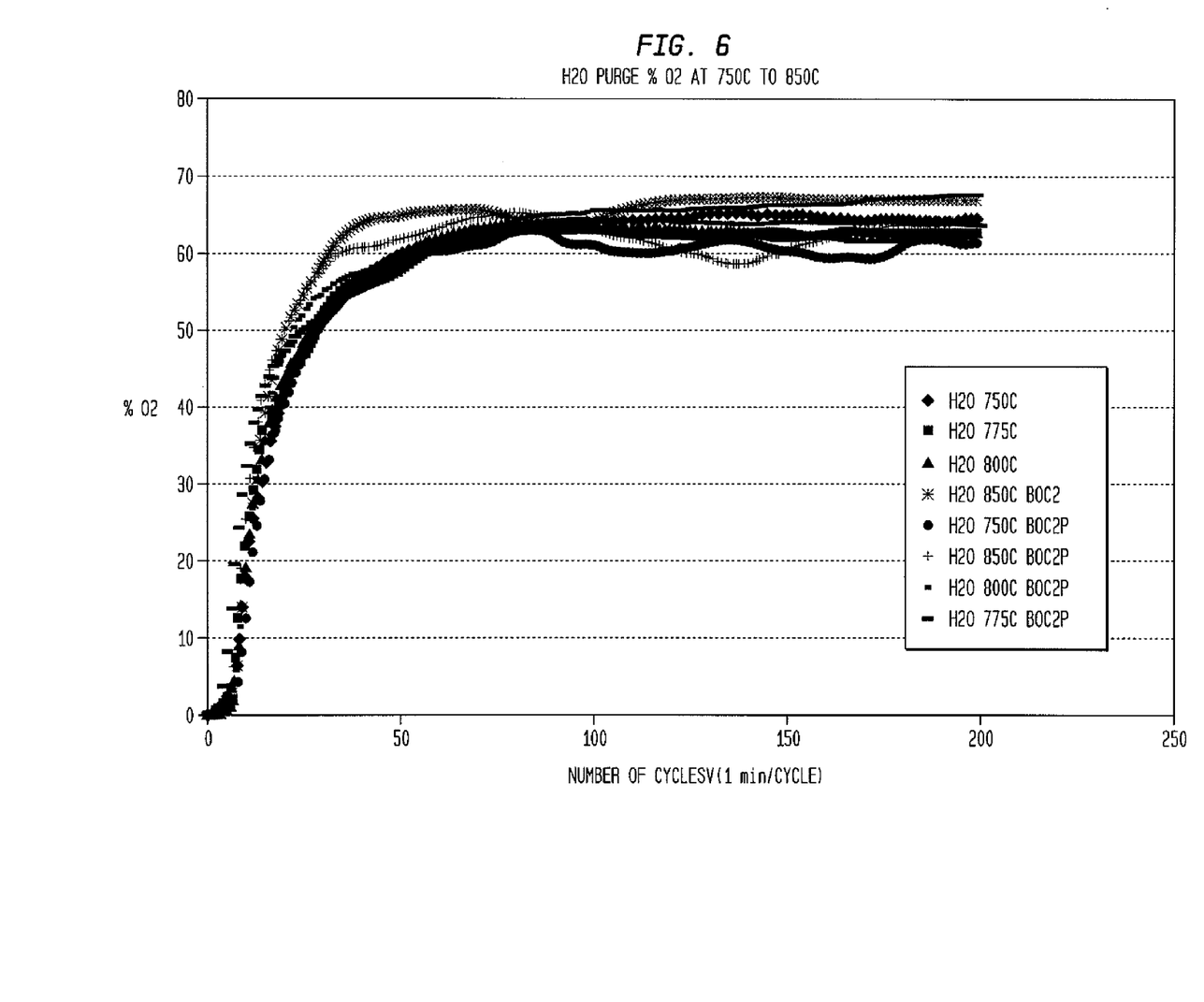
FIG. 6 shows graphically results of specific CAR experiments over a temperature range, 750 to 850° C., as percentage of oxygen in an air-based product gas stream at column outlet with steam as purge gas, as dependence on number of cycles performed.

FIG. 6 shows results of specific CAR experiments over a temperature range, 750 to 850° C., as percentage of oxygen in an air-based product gas stream at column outlet with steam as purge gas, as dependence on number of cycles performed (total length of cycle comprised by sorption and purge steps: 1 min). The air-inlet pressure was set at 780 torr. The flow rate of water purge stream was controlled manually and kept at 7.5 $cm^3$ $min^{-1}$ in all experiments. The charts show oxygen enrichment by the CAR process performed on three different BOC-II samples of one and the same chemical composition $La_{0.2}Sr_{0.8}Co_{0.6}Fe_{0.4}O_{3-\delta}$: (1) first extrudate batch (no notation), (2) a bead sample (notation: BOC2), (3) a pellet sample (notation: BOC2 P). The sorbent samples are essentially non-porous having a BET-type specific surface area <0.5 $m^2$ $g^{-1}$.

After a start-up period, enrichment leads to nearly constant oxygen levels in the product stream amounting to about 60 to 70% oxygen (with nitrogen and water as residuals), which are almost independent of both the type of secondary particle shape and process temperature.

Example 4

A combination of results of Examples 2 and 3 enables to predict a significant increase in oxygen content in product streams based on air as feed gas for the CAR process. This holds for process versions with any type of oxygen partial pressure decrease in order to release oxygen from the bed: either by applying vacuum or purge by either steam or carbon dioxide or by their mixtures, or by other inert gases.

In each of those cases, it becomes possible to enable an up-to-three-fold increase in oxygen percentage in the product gas stream. This means that resulting oxygen-enriched gas products would essentially be composed of oxygen only, with traces of nitrogen still retained in the bed and of the purge gas used.

Although the foregoing description is intended to be representative of the invention, it is not intended to in any way limit the scope of the appended claims.

What is claimed is:

1. A method of separating a gas component from a mixture of gases by pressure swing adsorption, thermal swing absorption, or combination thereof comprising contacting said gas mixture with composite material comprising
   (A) one or more crystalline ceramic oxides selected from compounds within general formula (1):

$$A_xA'_{x'}B_yB'_{y'}O_{3-\delta} \qquad (1)$$ and (B) one or more crystalline ceramic oxides selected from compounds within general formulas (2), (3), (4), (5), (6), (7), and (8):

$$A_2BO_{4-\delta} \qquad (2)$$

$$A_2B_2O_{5-\delta} \qquad (3)$$

$$AO(ABO_{3-\delta})_n \qquad (4)$$

$$AM_2(Cu_3O_{7-\delta}) \qquad (5)$$

$$Bi_4V_{2(1-x)}Me_{2x}O_{11-3x}, \qquad (6)$$

$$A''B''O_3 \qquad (7)$$

$$A_2B_2O_{7-\delta} \qquad (8)$$

wherein:
   A and A' are independently selected from ions of atoms having atomic numbers ranging from 57-71, inclusive, a cation of yttrium, ions of Group 1 atoms, ions of Group 2 atoms, and combinations of two or more, where Group 1 and Group 2 refer to the periodic table of elements;
   B, B', and B" are independently selected from d-block transition metal ions;
   A" is an ion of Na or Li;
   M is a metal cation selected from cations of Group 2 atoms of the periodic table of elements;
   Me is a metal ion selected from ions of Cu, Bi, and Co atoms;
   x+x'=1.0 and y+y'=1.0;
   x, x', y, and y' are real numbers independently ranging from about 0.01 to 1.0;
   n ranges from 1 to about 10; and
   δ ranges from about 0.05 to about 0.30.

2. A method of separating a gas component from a mixture of gases by pressure swing adsorption, thermal swing absorption, or combination thereof comprising contacting said gas mixture with a composite material comprising:
   (A) one or more crystalline ceramic oxides selected from compounds within general formula (1):

$$A_xA'_{x'}B_yB'_{y'}O_{3-\delta} \qquad (1)$$ and (B) one or more crystalline ceramic oxides selected from compounds within general formulas (2), (3), (4), (5), (6), (7), and (8):

$$A_2BO_{4-\delta} \qquad (2)$$

$$A_2B_2O_{5-\delta} \qquad (3)$$

$$AO(ABO_{3-\delta})_n \qquad (4)$$

$$AM_2(Cu_3O_{7-\delta}) \qquad (5)$$

$$Bi_4V_{2(1-x)}Me_{2x}O_{11-3x}, \qquad (6)$$

$$A''B''O_3 \qquad (7)$$

$$A_2B_2O_{7-\delta} \qquad (8)$$

wherein:
   A and A' are independently selected from ions of atoms having atomic numbers ranging from 57-71, inclusive, a cation of yttrium, ions of Group 1 atoms, ions of Group 2 atoms, and combinations of two or more, where Group 1 and Group 2 refer to the periodic table of elements;
   B, B', and B" are independently selected from d-block transition metal ions;
   A" is an ion of Na or Li;
   M is a metal cation selected from cations of Group 2 atoms of the periodic table of elements;
   Me is a metal ion selected from ions of Cu, Bi, and Co atoms;
   x+x'=1.0 and y+y'=1.0;
   x, x', y, and y' are real numbers independently ranging from about 0.01 to 1.0;
   n ranges from 1 to about 10; and
   δ ranges from about 0.05 to about 0.30;
   the composite of (A) and (B) being a matrix, with one or more binary metal oxides dispersed on or in said matrix.

* * * * *